United States Patent [19]

Takeuchi

[11] Patent Number: 5,230,567

[45] Date of Patent: Jul. 27, 1993

[54] SWIVEL MOUNTED LINEAR MOTION BALL BEARING

[75] Inventor: Mitsuo Takeuchi, Iwaki, Japan

[73] Assignee: Takeuchi Precision Works Co., Ltd., Iwaki, Japan

[21] Appl. No.: 737,995

[22] Filed: Jul. 30, 1991

[30] Foreign Application Priority Data

Aug. 6, 1990 [JP]  Japan .................. 2-208866

[51] Int. Cl.⁵ .............................................. F16C 31/06
[52] U.S. Cl. ..................................... 384/43; 384/57
[58] Field of Search ................................ 384/43–45, 384/38, 57, 49, 495; 464/168

[56] References Cited

U.S. PATENT DOCUMENTS 4,120,538 10/1978 Headen ..................... 384/495 X
4,729,145 3/1988 Egner-Walter et al. .......... 384/38 X
4,764,154 8/1988 Teramachi ................... 384/517 X

FOREIGN PATENT DOCUMENTS 1287382 1/1969 Fed. Rep. of Germany ........ 384/43
3815318 11/1989 Fed. Rep. of Germany ...... 384/495
84215 4/1991 Japan ........................... 384/45

Primary Examiner—Thomas R. Hannon
Attorney, Agent, or Firm—Antonelli, Terry, Stout & Kraus

[57] ABSTRACT

A linear motion ball bearing having a ball bearing portion provided with an outer sleeve, a ball retainer fitted in the outer sleeve, ball bearings retained in a circulating passage formed in the ball retainer, and a flange portion for fixing the ball bearing portion to a machine or an apparatus. The ball bearing portion has an annular collar having a spherical outer surface around an end section thereof, and the flange portion has a hollow space defined by a spherical inner surface concentric with the collar. The ball bearing portion is adapted to swivel with respect to the flange portion so that an angle of inclination of a shaft, which is held in the ball bearing portion, with respect to, for example, a plane at which the flange portion is fixed to a machine or an apparatus can be arbitrarily set, thereby enabling the linear motion ball bearing to be fixed to a machine or an apparatus simply, easily and accurately.

7 Claims, 4 Drawing Sheets

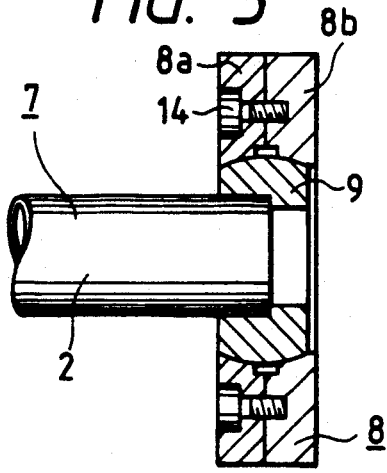
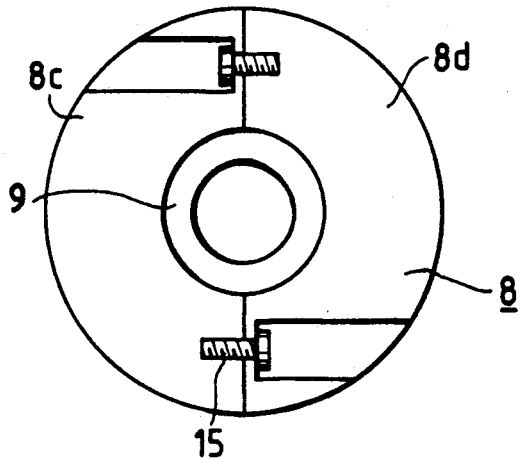
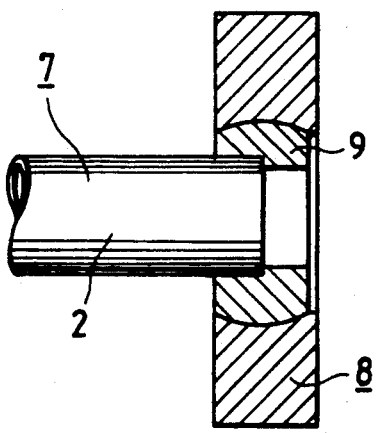
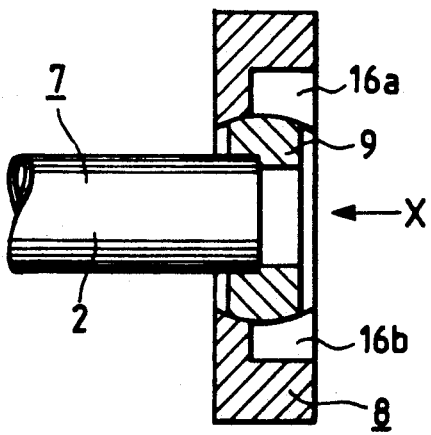
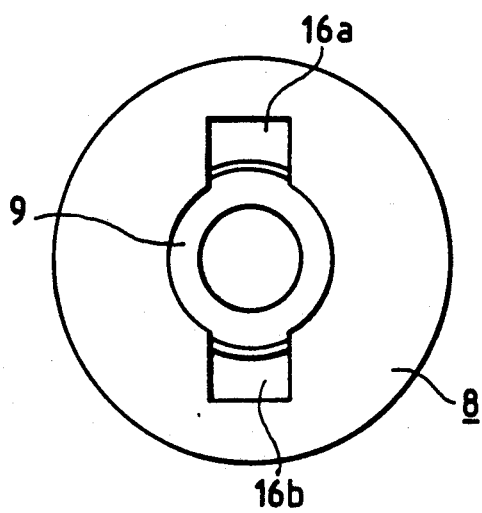

SWIVEL MOUNTED LINEAR MOTION BALL BEARING

BACKGROUND OF THE INVENTION

1. Field of the Invention

This invention relates to a linear motion ball bearing, and, more particularly, to a linear motion ball bearing having a flange to be fixed to a machine or an apparatus.

2. Description of the Prior Art

A linear motion ball bearing is so formed that several rows of balls receive a load as they make endless circulating movements from and then back to the side of the load through the return circuits in a ball retainer. When the linear motion ball bearing is used in combination with a shaft, light, linear reciprocating movements are obtained due to a minimal frictional resistance based on the close and smooth rolling contact, and this significantly contributes to the saving of energy. A combination of the linear motion ball bearing and a shaft is used extensively for various types of measuring instruments, medical equipment and computer terminal equipment, not to speak of industrial robots.

Especially, in order to set a shaft in a machine or an apparatus conveniently by using such a linear motion ball bearing, a flange-carrying linear motion ball bearing shown in FIGS. 9 and 10 is used. Referring to FIGS. 9 and 10, a ball bearing portion includes a linear motion ball bearing outer sleeve 2 (hereinafter referred to as an outer sleeve) a ball retainer (not shown) fitted in the outer sleeve 2, and balls 3 retained in the ball retainer, with a flange portion 4 being attached to one end of the outer sleeve 2 in the ball bearing portion 1 and provided with bolt holes 5 for use in fixing the flange portion to a machine or an apparatus, and with a shaft 6 supported in the ball bearing portion 1.

When such a flange-carrying linear motion ball bearing is used to move a machine or an apparatus along a shaft both ends of which are fixed, the ball bearing portion 1 is fixed to a portion of the machine or apparatus via the flange portion 4 to enable the machine or apparatus to be moved along the shaft.

The above-described linear motion ball bearing consisting of a ball bearing portion 1 and a flange portion 4 can be fixed to a machine or an apparatus simply and speedily as compared with a linear motion ball bearing not provided with a flange portion but it is not always easy to secure the squareness of the surface of the flange portion 4 at which the flange portion 4 is attached to a machine or an apparatus with respect to the axis of the ball bearing portion 1 when fixing the flange portion 4 to a machine or an apparatus. For example, when the surface of a machine or an apparatus to which the flange portion 4 is to be fixed is black, i.e., not machined, it is necessary that this surface be subjected to scaling and surface finishing. When the scaling is not done, a shim is inserted between the surface of the machine or apparatus to which the flange portion 4 is to be fixed and the flange portion 4, whereby the squareness of the mentioned surface with respect to the axis of the ball bearing portion 1 is secured.

Especially, when such a ball bearing portion 1 is fixed via the flange portion 4 to a machine or an apparatus which is to be mounted on a shaft in an inclined state with respect thereto as will be described later, the mounting requires considerable time and labor and a high bearing fixing accuracy cannot be obtained.

Such an operation increases the number of work hours, and includes a trial and error operation. Therefore, it has been demanded that this operation be improved for obtaining higher bearing fixing accuracy and efficiency.

SUMMARY OF THE INVENTION

It is an object of the present invention to solve the problems of the conventional techniques and enable the provision of a flange-carrying linear motion ball bearing capable of being fixed to a machine or an apparatus with high accuracy and efficiency.

It is another object of the present invention to enable the provision of a method capable of manufacturing such linear motion ball bearings in various manners with ease.

The linear motion ball bearing according to the present invention has a ball bearing portion provided with an outer, sleeve, with a ball bearing retainer fitted in the outer sleeve, and with ball bearings retained in a circulating passage formed in the ball bearing retainer. A flange portion fixes the ball bearing portion to a machine or an apparatus, with the ball bearing portion being movable with respect to the flange portion.

For example, in another linear motion ball bearing having a ball bearing portion provided with an outer sleeve, a ball retainer fitted in the outer sleeve, ball bearings retained in a circulating passage formed in the ball retainer, and a flange portion used to fix the ball bearing portion to a machine or an apparatus, the ball bearing portion is provided, at an end section of the outer sleeve, with an annular collar having a spherical outer surface and an axis aligned with that of the ball bearing portion. The flange portion includes a hollow space having an spherical inner surface concentric with the annular collar, in which the collar is held so that the ball bearing portion can swivel with respect to the flange portion.

Providing the flange portion with a means for fixing the ball bearing portion thereto constitutes another characteristic, with the fixing means comprising, for example, of a slit-carrying lock screw.

The manufacturing of a linear motion ball bearing according to the present invention can be done by various types of methods, for example, a method having the steps of dividing a flange portion into two members along a plane parallel to or perpendicular to a plane at which the flange portion is fixed to a machine or an apparatus, combining the resultant two divisional flange members with each other from both sides of the collar of the ball bearing portion, and then fastening these flange members to each other with locking members, for example, bolts.

After the collar of the ball bearing portion has been held in the flange portion, the outer sleeve in the ball bearing portion is fixed to the collar held in the flange portion.

After the collar in the ball bearing portion has been inserted into an held in the flange portion via rectangular grooves provided in the diametrical direction of the shaft inserting hole in the flange portion, an end portion of the outer sleeve in the ball bearing portion is fixed to the collar.

The flange portion can also be produced by, for example, a die casting method or a lost wax process (precision casting) using the collar in a ball bearing portion as a male mold. In this case, the production of a flange portion and the assembling of a collar in a ball bearing portion and flange portion can be practiced simultaneously.

In the linear motion ball bearing thus formed, the ball bearing portion has an annular collar at an end section thereof, and the flange portion has a hollow space having a spherical inner surface concentric with the collar. The ball bearing portion is set to be able to swivel with respect to the flange portion. Accordingly, the angle of inclination of a shaft, which is supported on the ball bearing portion, with respect to, for example, a plane at which the flange portion is fixed to a machine or an apparatus can be arbitrarily set. Consequently, the linear motion ball bearing can be fixed to a machine or an apparatus simply and easily with a high accuracy.

BRIEF DESCRIPTION OF THE DRAWINGS

The present invention will be understood by reference to the following detailed description and the accompanying drawings, wherein:

FIG. 3 is a sectional view of a portion of a linear motion ball bearing of a first embodiment of a method of manufacturing linear motion ball bearings according to the present invention;

FIG. 4 is a partially sectioned plan view of a second embodiment of the same method;

FIG. 5 is a sectional view of a portion of a linear motion ball bearing in accordance with a third embodiment of the same method;

FIG. 6a is a sectional view of a portion of a linear motion ball bearing in accordance with a fourth embodiment of the same method;

FIG. 6b is a plan view taken in the direction X in FIG. 6a;

FIG. 9a is a front elevation of a conventional flange-carrying linear motion ball bearing;

FIG. 9b is a side elevation of the bearing of FIG. 9a; and

FIG. 10 is an oblique view of the of FIG. 9a.

DESCRIPTION OF THE PREFERRED EMBODIMENTS

Figure 1:
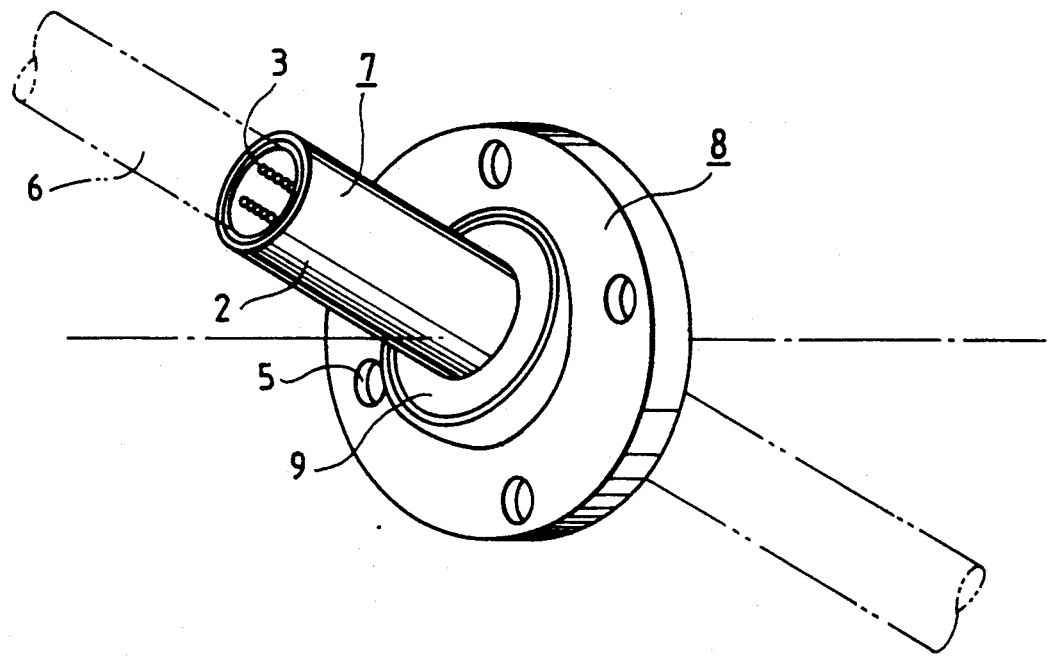
FIG. 1 is an oblique view of an embodiment of the linear motion ball bearing according to the present invention.
Figure 2:
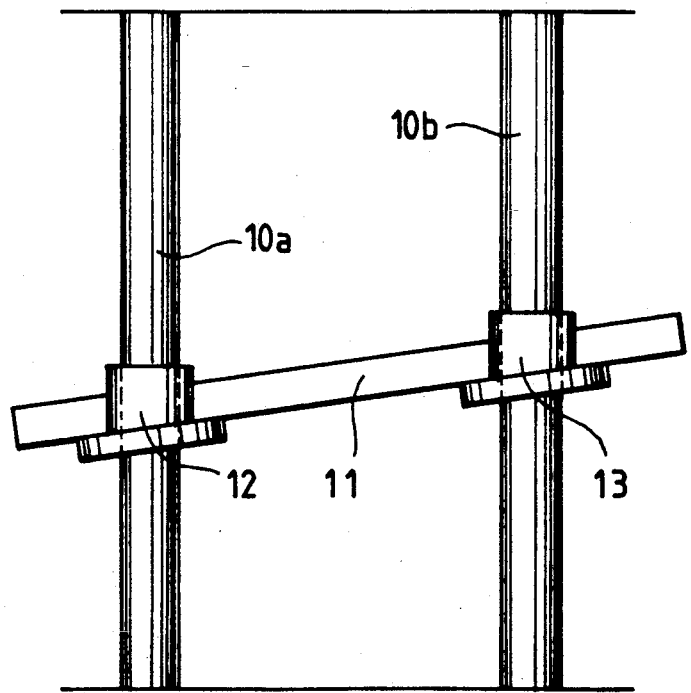
FIG. 2 illustrates the embodiment fixed to a machine or an apparatus.

Referring now to the drawings wherein like reference numerals are used throughout the various views to designate like parts and, more particularly, to FIGS. 1 and 2, according to these figures, a linear motion ball bearing in accordance with the present invention includes a ball bearing portion 7 and a flange portion 8, with an annular collar 9 having a spherical outer surface fixed to one end of an outer sleeve 2 in the ball bearing portion 7 and having an axis aligned with that of the ball bearing portion 7. The flange portion 8 is formed separately from the ball bearing portion 7, and has, in a central part thereof, a hollow space having a spherical inner surface concentric with the collar 9. The flange portion 8 is further provided with a hole to which the outer sleeve 2 in the ball bearing 7 is threaded and bolt holes 5 for use in attaching the flange portion 8 to a part of a machine or apparatus.

Accordingly, when a shaft 6 is held on the ball bearing portion 7 of this linear motion ball bearing, the angle of inclination of the shaft 6 with respect to the flange portion 8 can be arbitrarily selected as shown in FIG. 1.

When a shaft is set perpendicularly in a machine or an apparatus by using the linear motion ball bearing in this embodiment, the angle at which the shaft is set in a machine or an apparatus can be regulated freely even if a part of the machine or apparatus is not completely right-angle with respect to the shaft. Therefore, the shaft can be easily fixed in a desired position in a very simple manner. Therefore, the processing of the surface to which the flange portion is to be fixed of a machine or an apparatus and the regulating of the flange portion fixing angle, which are required when a conventional flange-carrying linear motion ball bearing is fixed to a machine or an apparatus, becomes unnecessary.

As shown in FIG. 2, both ends of shafts 10a, 10b are fixed, with a part 11 being movable in an inclined state with respect to the shafts 10a, 10b of a machine or apparatus by linear motion ball bearings 12, 13 corresponding to the ball bearing arrangement shown in FIG. 1. Although conventional flange-carrying linear motion ball bearings and a machine or apparatus having the illustrated positional relationship cannot be easily assembled, such as assembly operation can be carried out very simply with high accuracy if the same linear motion ball bearings shown in FIG. 1 are used.

As shown in FIG. 3, a collar 9 in a ball bearing portion 7, produced by threading one end portion of an independently formed outer sleeve 2 to one side of the independently formed collar 9 provided with a shaft passing hole, is held in two identical disc type flange members 8a, 8b each of which has, at its inner circumferential portion, a hollow space having a spherical inner surface concentric with the spherical outer surface of the collar 9 in the ball bearing portion, and the flange members 8a, 8b are then combined or joined by bolts 14.

in FIG. 4 a flange portion 8, divided into two sections in a direction at right angles to the surface thereof at which the flange portion 8 is fixed to a machine or an apparatus so as to provide, for example, flange portions 8c, 8d. As in the first embodiment, a collar 9 in a ball bearing portion 7 is held between the two divisional flange members 8c, 8d, which are then combined or joined by bolts 15.

In FIG. 5, an outer sleeve 2 and a collar 9 are combined to produce a ball bearing portion 7, with a flange portion 8 then being formed around the collar 9 in a ball bearing portion 7 by a die casting method or a lost wax process (precision casting). If this method is used, the production of the flange portion 8 and the assembling of the collar 9 and flange portion 8 can be simultaneously effected.

In this method, the outer sleeve 2 in the ball bearing portion 8 and the collar 9 are joined to each other by threading, and brazing may be used instead of the threading.

In the linear motion ball bearing of FIGS. 6a–6b, rectangular grooves 16a, 16b are provided in diametrically opposite portions of a shaft inserting hole. In this embodiment, a ball bearing can be produced by initially inserting a collar 9 in a ball bearing portion 7 into a hollow space in a flange portion 8 by utilizing the grooves 16a, 16b, and then threading an outer sleeve 2 in the ball bearing portion 7 into the collar 9 inserted in the flange portion 8.

The flange portion may be formed not only circularly but also may be square or rectangular in shape, i.e., to an arbitrary shape in accordance with the requirements.

If a means for fixing the ball bearing portion 7 to the flange portion 8, for example, a thread is provided in the flange portion, the regulating of the fixing angle can be effectively carried out after the regulation of a position in which the ball bearing portion 7 is fixed to the flange portion 8 has been completed.

Figure 7:
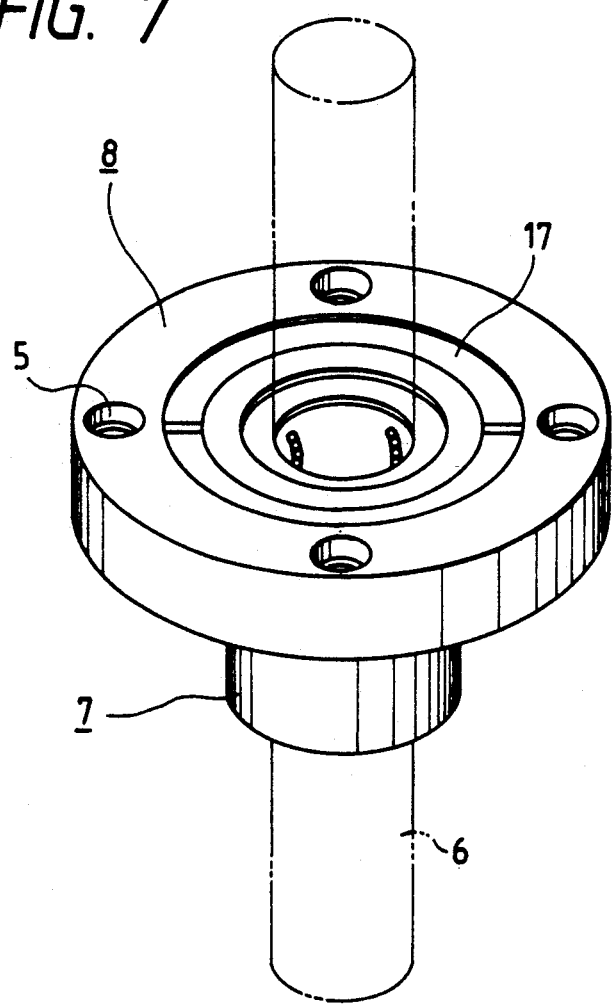
FIG. 7 is an oblique view illustrating a fifth embodiment of the same method.
Figure 8:
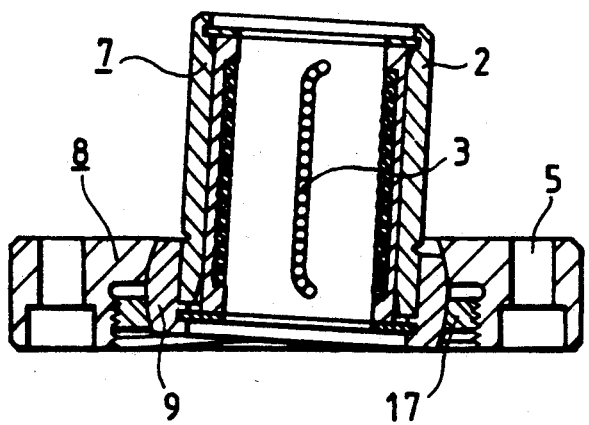
FIG. 8 is a sectional view of a portion of the embodiment of FIG. 7.
Figure 9:
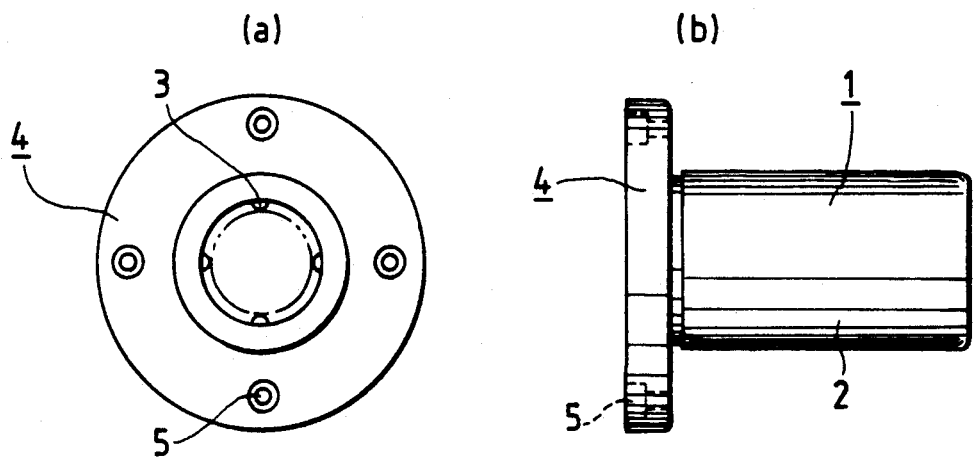
Figure 10:
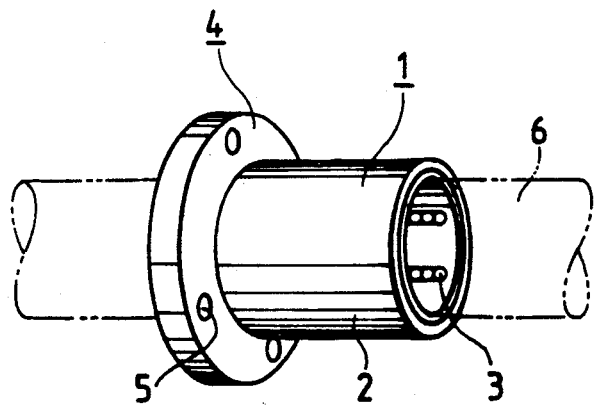

In the embodiment of FIGS. 7 and 8 a slit-carrying lock screw is used to practice a method of fixing the ball bearing portion 7 to the flange portion 8. A slit-carrying lock screw 17 is loosened, and the fixing angle is regulated with the ball bearing portion 7 in a movable state with respect to the flange portion 8. The slit-carrying lock screw 17 is tightened when the fixing angle has been determined. The fixing of the ball bearing portion 7 to the flange portion 8 is completed in a simple operation.

In the linear motion ball bearing according to the present invention, the ball bearing portion in which a shaft is to be fitted is movable with respect to the flange portion to be fixed to a machine or an apparatus. Accordingly, the fixing of the flange-carrying linear motion ball bearing can be practiced accurately and efficiently. Especially, when a machine or an apparatus is mounted on a shaft even inclined with respect thereto, the fixing of the ball bearings can be accomplished very simply and easily. The linear motion ball bearing according to the present invention can be manufactured easily by various type of methods, and has a large industrial effect.

What is claimed is:

1. A linear motion ball bearing comprising:
   a ball bearing portion provided with an outer sleeve, a ball retainer fitted in the outer sleeve, and ball bearings retained in a circulating passage formed in the ball retainer;
   a flange portion for fixing the ball bearing portion to a machine or an apparatus, and
   wherein said ball bearing portion is adapted to swivel with respect to the flange portion.

2. The linear motion ball bearing according to claim 1, wherein said flange portion includes means for fixing the ball bearing portion thereto.

3. The linear motion ball bearing according to claim 2, wherein means for fixing includes a slit-carrying lock screw cooperable with the flange portion to fix the ball bearing portion to the flange portion.

4. The linear motion ball bearing according to claim 1, wherein a slit-carrying lock screw is threaded into a hollow space in the flange portion, said slit-carrying lock screw including a spherical inner surface concentric with an annular collar of the ball bearing portion.

5. A linear motion ball bearing comprising:
   a ball bearing portion provided with an outer sleeve, a ball retainer fitted in the outer sleeve, and ball bearings retained in a circulating passage formed in the ball retainer;
   a flange portion adapted to fix the ball bearing portion to a machine or an apparatus,
   wherein said ball bearing portion is provided at an end section of the outer sleeve with an annular collar having a spherical outer surface and an axis aligned with that of the ball bearing portion, and wherein said flange portion has a hollow space including a spherical inner surface concentric with the annular collar, in which the collar is held so that the ball bearing portion can swivel with respect to the flange portion.

6. The linear motion ball bearing according to claim 5, wherein said flange portion includes means for fixing the ball bearing portion thereto.

7. The linear motion ball bearing according to claim 6, wherein said means for fixing includes a slit-carrying lock screw cooperable with the fixed portion to fix the ball bearing portion with respect to the flange portion.

* * * * *